(12) United States Patent
Cadwalader (10) Patent No.: US 6,347,944 B1
(45) Date of Patent: Feb. 19, 2002

(54) RADIATION DEMONSTRATION SYSTEM

(75) Inventor: John A. Cadwalader, Overland Park, KS (US)

(73) Assignee: Worldwide Innovations & Technologies, Inc., Overland Park, KS (US)

( * ) Notice: Subject to any disclaimer, the term of this patent is extended or adjusted under 35 U.S.C. 154(b) by 0 days.

(21) Appl. No.: 09/272,027

(22) Filed: Mar. 18, 1999

(51) Int. Cl.[7] .............................................. G09B 23/28
(52) U.S. Cl. ..................... 434/262; 434/218; 446/268
(58) Field of Search ................................. 446/175, 219, 446/218, 485, 268, 370, 380, 385; 434/218, 262, 272

(56) References Cited

U.S. PATENT DOCUMENTS

| | | | | |
|---|---|---|---|---|
| 2,748,256 A | * | 5/1956 | Moran | 446/485 |
| 3,487,559 A | * | 1/1970 | Freedman | 434/218 |
| 4,014,109 A | * | 3/1977 | Schramm | 434/218 |
| 4,585,424 A | * | 4/1986 | DeMars | 446/485 |
| 4,878,873 A | * | 11/1989 | Yamaguchi et al. | 446/485 |
| 5,439,407 A | * | 8/1995 | Friedel | 446/219 |
| 5,830,034 A | * | 11/1998 | Ciechanowski et al. | 446/219 |

* cited by examiner

*Primary Examiner*—Sam Rimell
(74) *Attorney, Agent, or Firm*—Foley & Lardner (57) ABSTRACT

An apparatus for demonstrating the properties of radiation is disclosed. The apparatus includes a generally non-opaque matrix and a light source adjacent the matrix, wherein a light generated by the light source tends to cause at least a portion of the matrix to glow.

40 Claims, 7 Drawing Sheets

RADIATION DEMONSTRATION SYSTEM

CROSS-REFERENCE TO RELATED APPLICATIONS

The following U.S. Patent is cross-referenced and incorporated by reference herein: U.S. Pat. No. 4,938,233 titled "RADIATION SHIELD" issued Jul. 3, 1990 to Orrison, Jr.

FIELD OF THE INVENTION

The present invention relates to the modeling of radiation. More particularly, the present invention relates to using a visual model to demonstrate the effects of radiation as it enters and exits a subject.

BACKGROUND OF THE INVENTION

Radiation can be provided by a variety of natural or man-made sources and can be electromagnetic energy at wavelengths of $1.0 \times 10^{-15}$ meters (e.g., cosmic rays) to $1.0 \times 10^6$ meters (e.g., radiation from AC power lines). Some forms of radiation can be manipulated for beneficial purposes (e.g., the selective irradiation of cancerous cells) or may have negative effects (e.g., radiation may increase the aging process).

It is important in certain fields to understand how radiation works. For example: those in the medical field may wish to understand the effects of x-ray radiation on portions of the human body (e.g., thyroid area, male gonadal areas, female gonadal areas, breast area, hands, eyes, etc.); those in the travel field may wish to understand how cosmic rays affect living tissue during air or space travel; students may wish to investigate the scientific principles involved in electromagnetic radiation. In this regard, an understanding of the properties, characteristics and theories related to radiation may be important for understanding the principles involving electricity and magnetism, the wave-particle duality of light, and the energy levels of the elements (among other things).

In particular, it may be important to understand how radiation is scattered and absorbed by an object (i.e., Compton scattering). It is believed that radiation may be quantized in small energy bundles (e.g., photons). It is further postulated that when an electromagnetic wave (e.g., photon, x-ray, light ray, etc.) is incident on a material containing a charge (i.e., protons or electrons) the material absorbs energy from the wave due to recoil, and the scattered wave has less energy than the incident wave (e.g., a lower frequency and longer wavelength).

It is known to describe the properties of electromagnetic radiation and Compton scattering using textual devices such as books and treatises. However, such textual devices have several disadvantages. First, students may find it difficult to comprehend the long paragraphs and chapters of such textual devices, which may cause some students to lose attention in the subject matter. Second, such textual devices may be overly complicated and may convey unnecessary information, which may cause students to lose focus on a major concept or a big picture. Third, it may be difficult for some students to visualize the subject matter described in such textual devices.

In an attempt to overcome the shortcomings of such textual devices, the use of graphic devices has been known. For example, illustrated pictures may supplement such textual devises in describing the subject matter at issue. However, such graphical devices have several disadvantages. First, such graphical devices are often one dimensional, which may be difficult for some students to visualize. Second, such graphical devices ordinarily do not include an educational "hook", which helps students to understand a concept. Third, students may have reservations about opening or accessing a textual device to view such graphical devices.

Accordingly, there is a need for an apparatus for demonstrating the characteristics of radiation in three dimensions. There is also a need for an apparatus to demonstrate the effects of radiation and how to protect against such effects. There is still further a need for a method for demonstrating the properties and effects of radiation.

SUMMARY OF THE INVENTION

The present invention relates to an apparatus for demonstrating the properties of radiation. The apparatus includes a generally non-opaque matrix, and a light source adjacent the matrix.

The present invention further relates to an apparatus for demonstrating the effects of radiation. The apparatus includes a translucent polymeric matrix and a subject at least partially surrounded by the matrix. The apparatus also includes a light source mounted to the matrix, wherein a light generated by the light source and directed toward the matrix causes a portion of the matrix to glow.

The present invention further relates to a method for demonstrating the properties and effects of radiation. The method includes providing a matrix. The method also includes providing a light source adjacent the matrix. The method further includes illuminating the matrix with an incident light generated by the light source such that a portion of the matrix tends to glow.

DETAILED DESCRIPTION OF THE PREFERRED EMBODIMENTS

Figure 1:
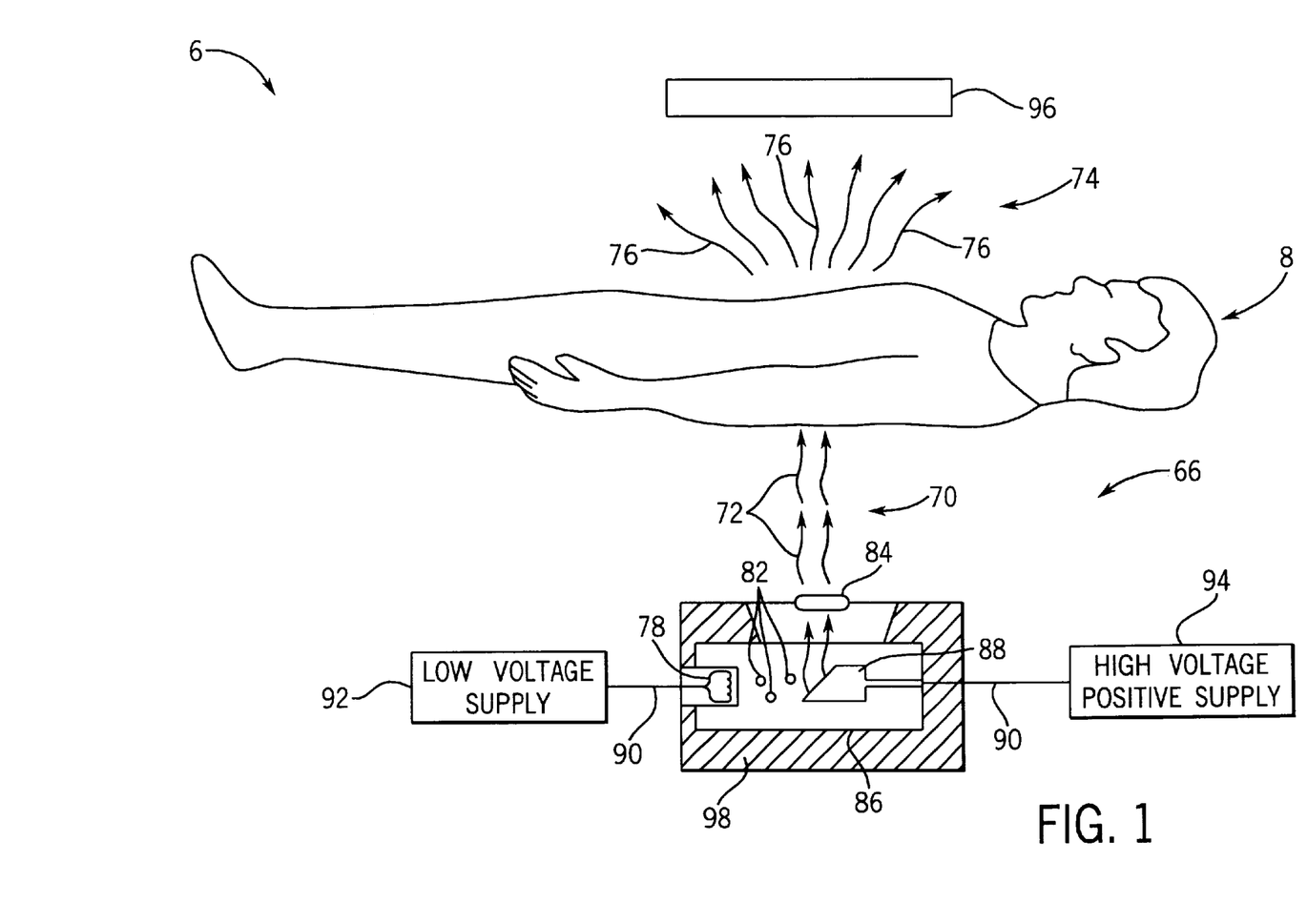
FIG. 1 is a side elevation view of a human undergoing exposure to electromagnetic radiation.

Referring to FIG. 1, an x-ray system 6 is shown. X-ray system 6 includes a subject (shown as a human 8) undergoing exposure to radiation (shown as an X-ray 70). Human 8 is irradiated by a radiation source (e.g., natural or fabricated) shown as an x-ray tube 66 that generates x-ray 70. Tube 66 includes a container (shown as a glass envelope 86) that vacuum encapsulates both a filament 78 and a positively charged source (shown as a tungsten anode 88). A shielding material shown as an oil 98 surrounds envelope 86 to inhibit x-ray 70 from escaping tube 66. To generate electrons 82, filament 78 is heated by a power supply (shown as a low voltage power supply 92). A cable shown as a wire 90 connects anode 88 to a positively charged power supply shown as a high voltage positive supply 94. Anode 88 attracts electrons 82, which are subsequently radiated from tube 66 in the form of x-ray 70. X-ray 70 having a short wavelength 72 exits tube 66 through an aperture 84, which is unshielded by oil 98. Short wavelength x-ray 72 enters human 8, is absorbed and scattered by human 8, and exits human 8 as an exiting x-ray 74 having decreased energy and a long wavelength 76. A recording device shown as an x-ray film 96 measures exiting x-ray 74.

Figure 2A:
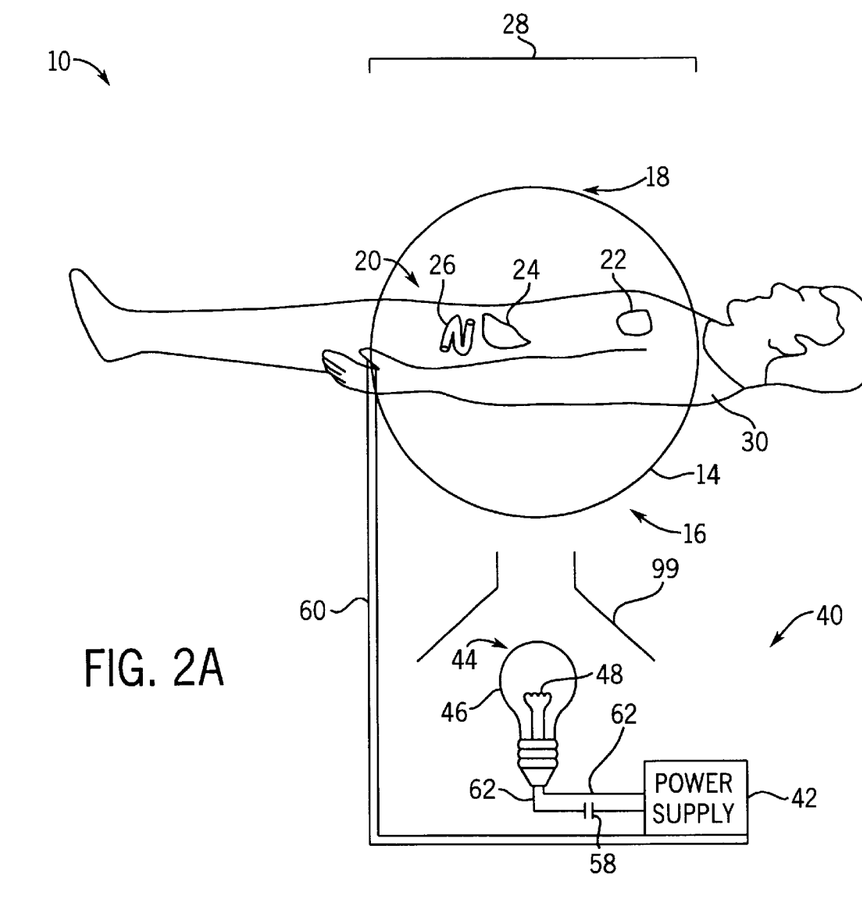
FIG. 2A is a side elevation view of a radiation demonstration system according to an exemplary embodiment of the present invention.

FIG. 2A shows a radiation demonstration system 10, which models X-ray system 6 of FIG. 1. System 10 includes a subject shown as a human figurine or a doll 12 having internal contents (shown as organs 20) surrounded by a matrix 14, which is mounted to a lighting assembly 40. Doll 12 is shown wearing a radiation-attenuating shield shown as a gown 30 that is selectively removable from doll 12. Doll 12 may be constructed of a non-opaque material such as a translucent plastic. The exterior of doll 12 surrounds organs 20 shown as a heart 22, a liver 24, and an intestine 26. According to alternative embodiments, the internal contents of the subject may be of a variety of sizes or shapes (e.g., skeleton, brain, broken bone, metallic object, foreign body, scalpel, etc.) and constructed of an opaque or non-opaque material such as paper, plastic, rubber, cardboard, etc. According to other alternative embodiments, the shield may be of the type and/or shape of the radiation shields described in U.S. Pat. No. 4,938,233 titled "RADIATION SHIELD" issued Jul. 3, 1990 to Orrison, Jr. and hereby incorporated by reference.

Figure 2B:
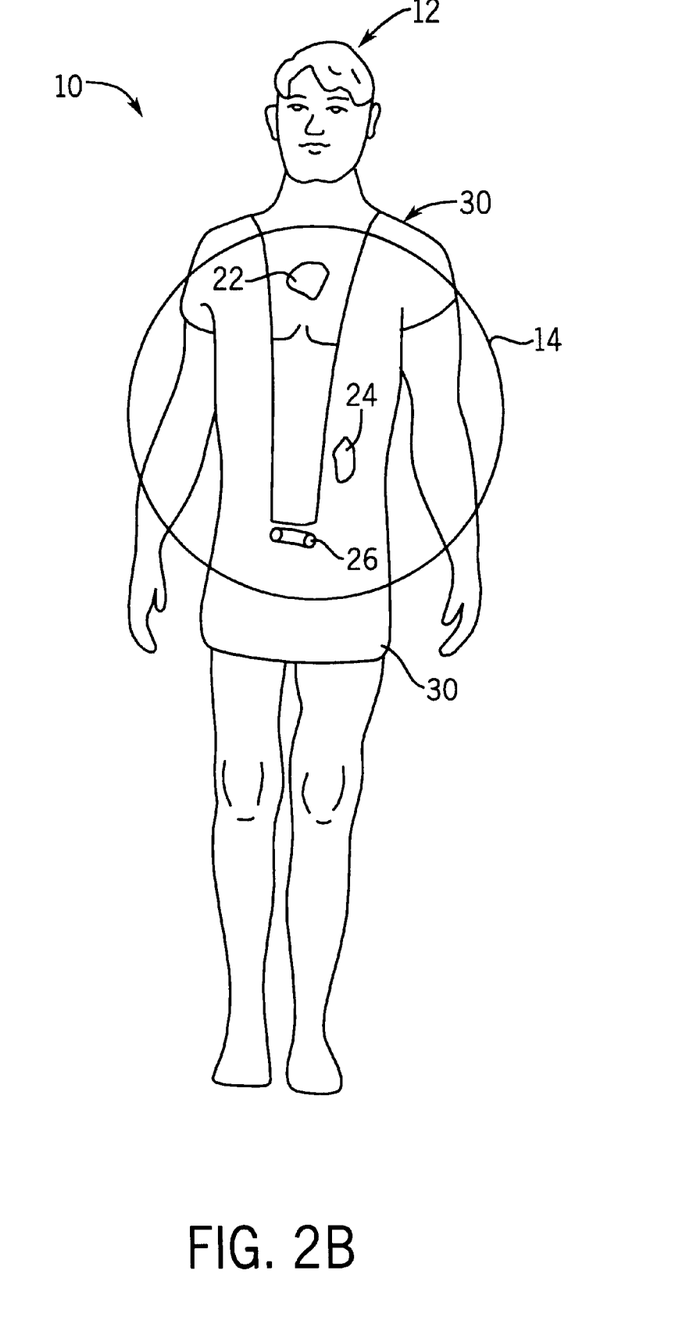
FIG. 2B is a front elevation view of the radiation system of FIG. 1A.
Figure 3:
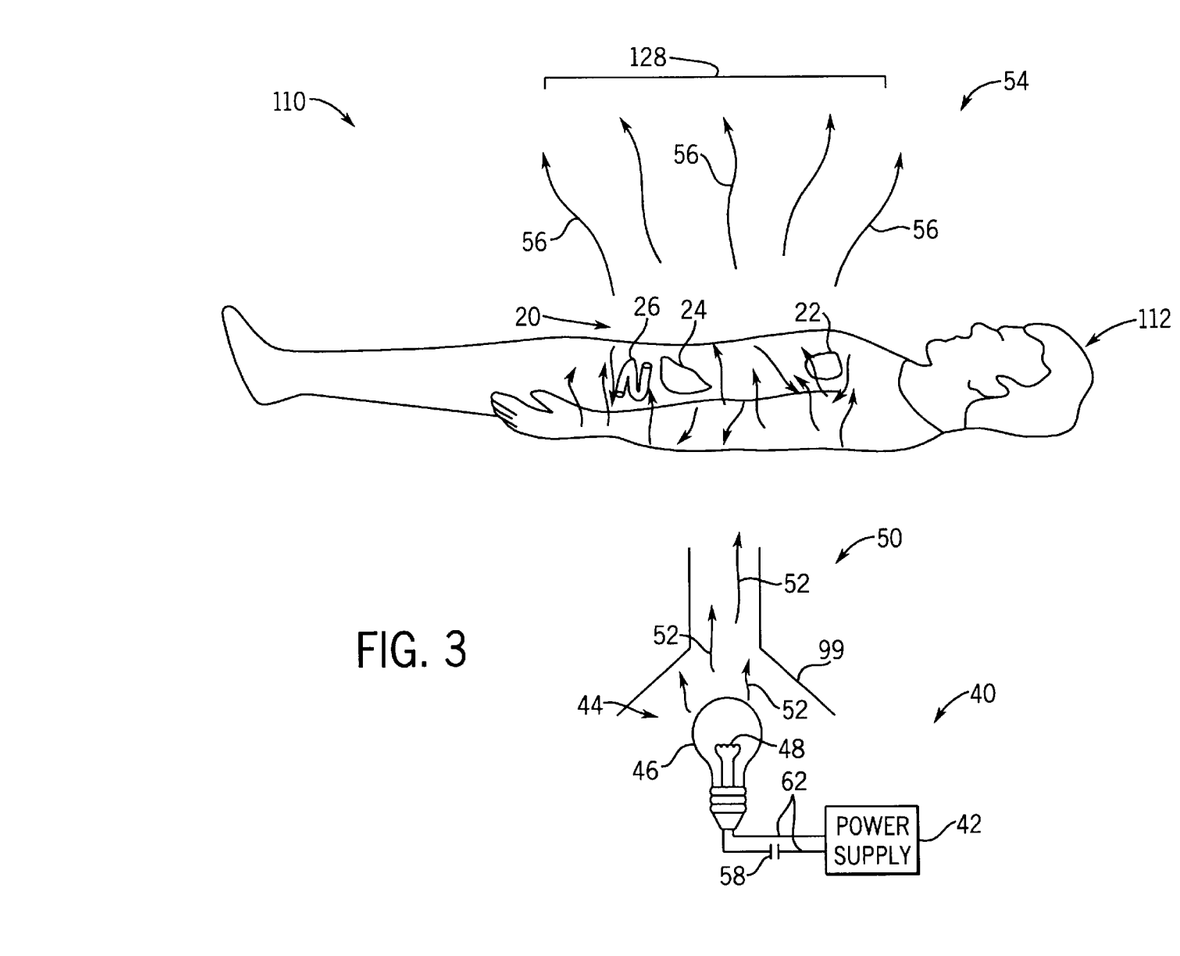
FIG. 3 is a side elevation view of a radiation demonstration system according to an alternative embodiment of the present invention.

Matrix 14 surrounds a central region 28 of doll 12. Matrix 14 is constructed of a non-opaque, flexible, rubber-like gel material, such as the material used in breast examination models commercially available from WRS Group, Inc. of Waco, Tex. The matrix may have a variety of structures. For example, matrix 14 may surround a portion of doll 12 as shown in FIG. 2B, or may surround the entire subject (not shown). According to an alternative embodiment, the subject may be constructed of the matrix in whole as shown in FIG. 3, or in part (not shown).

A variety of materials may be provided within the matrix. For example, the matrix may be charged with a radiation-attenuating filler material such as barium sulfate or a non-radiation-attenuating filler such as sand. According to alternative embodiments, the matrix may include a space that may be provided with an insulating material (e.g., fiberglass, wool, asbestos, spun plastic, spun metal, foam, insulating foam, urethane foam, etc.), a lightweight material (atmospheric air, helium, foam, liquid, etc.), or a heavier material (e.g., wax, paraffin, lead, barium, water, etc.). According to other alternative embodiments, the matrix may be provided with various scents, dyes, pigments, colors, bioluminescent materials, etc.

Lighting assembly 40 may be attached to matrix 14 by a connecting member shown as a stand 60 such that lighting assembly 40 is adjacent matrix 14. Lighting assembly 40 includes a light source 44 surrounded by a focusing device (shown as a shade 99) and attached to a power supply 42 by a cable (shown as a wire 62) having a switch 58. Light source 44 includes a filament 48 surrounded by a vacuum envelope shown as a bulb 46. When switch 58 is closed, electricity flows from power supply 42 to filament 48 by wire 62 so that light source 44 emits a light. According to an alternative embodiment, the stand may be attached to the subject, the matrix, or both the subject and the matrix. According to other alternative embodiments, the light source may be positioned inside the matrix, such that when pressure is applied to the matrix the switch of the light source is closed causing a light to emanate from the light source. As will be understood by those who review this disclosure, any lighting assembly attached or unattached to the subject and/or the matrix (such as a lamp, flashlight, natural light source, diode, etc.) may be used to illuminate the subject.

Figure 2C:
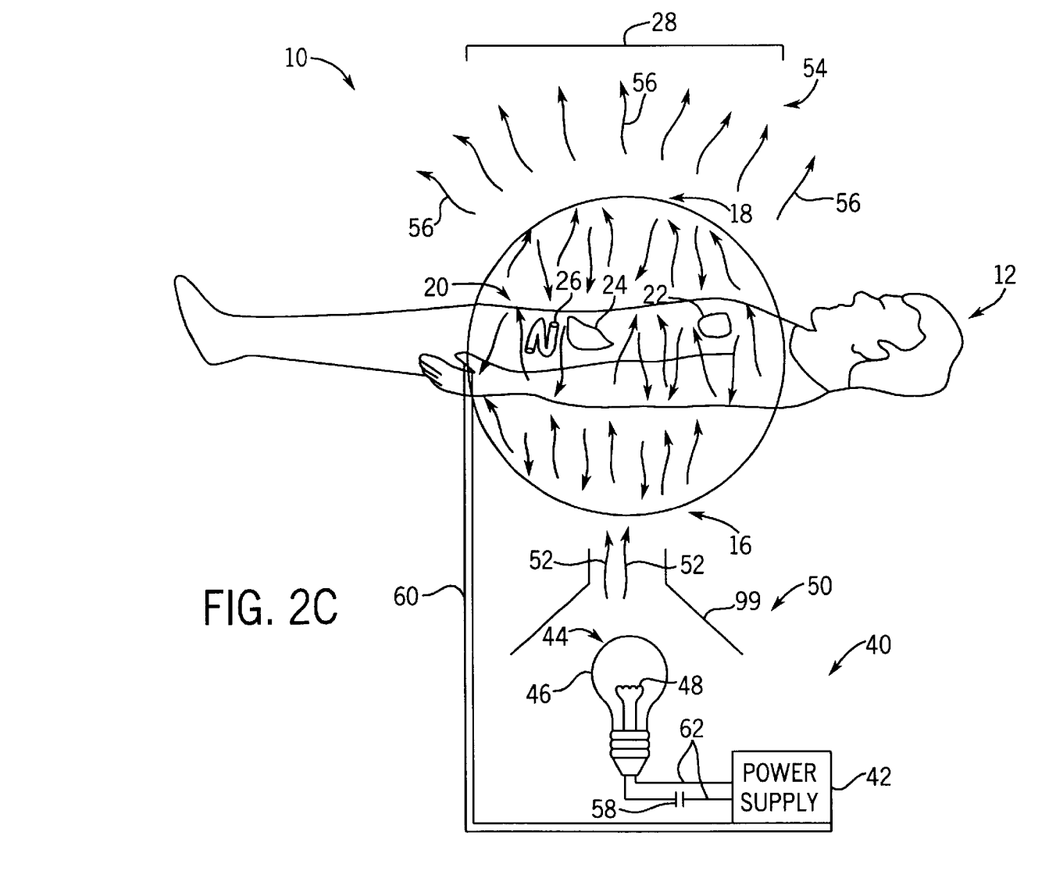
FIG. 2C is a side elevation view of the radiation demonstration system of FIG. 2A showing the scattering and absorption of radiation.

Referring to FIG. 2C, doll 12 is shown undergoing exposure to light (e.g., ray, beam, particle, collimated light, etc.) shown as incident light 50 having a short wavelength 52 generated by lighting assembly 40. Incident light 50 enters or illuminates proximal end 16 of matrix 14, doll 12 surrounded by matrix 14 and organs 20 surrounded by doll 12, such that matrix 14, doll 12 and organs 20 tend to glow or luminesce. As shown in FIGS. 2C–5, the central portion of the subject glows or is illuminated, even though the central portion comprises a larger area than the narrow ray of incident that light enters the subject and/or the matrix. This may show that when a relatively small amount of focused radiation (e.g., collimated x-rays from a medical x-ray machine) comes in contact with or is incident on an object, the radiation is scattered over a large area of the object.

According to any preferred or alternative embodiments, the intensity of the glow of the matrix, the subject and the internal contents may vary. Not wishing to be limited by theory, it is believed that the matrix, the subject and the internal contents absorb a portion of the incident light at the point of entry due to recoil. It is further believed that the incident light is scattered in a multitude of directions after coming in contact with the matrix, the subject and the internal contents to cause a glow effect. It is still further believed that an exiting light 54 departing from a distal end 18 of matrix 14 has less energy and a longer wavelength 56 than incident light 50 (see FIG. 2C). According to an alternative embodiment, the shield may be constructed of an opaque material, such as plastic, to hinder the incident light from entering the matrix and causing the matrix to glow. According to other alternative embodiments, the shield may be constructed of a polymeric matrix material such that the shield tends to glow when a beam of light is incident on the shield.

Referring to FIG. 3, a radiation demonstration system 110 is shown according to an alternative embodiment of system 10. System 110 includes lighting assembly 40 and a subject in the shape of a human figure shown as a doll 112. The exterior of doll 112 surrounds organs 20 shown as heart 22, liver 24, and intestine 26. Doll 112 may be constructed of a non-opaque matrix. According to an alternative embodiment, the lighting assembly may be mounted to the subject and/or the matrix.

Figure 4:
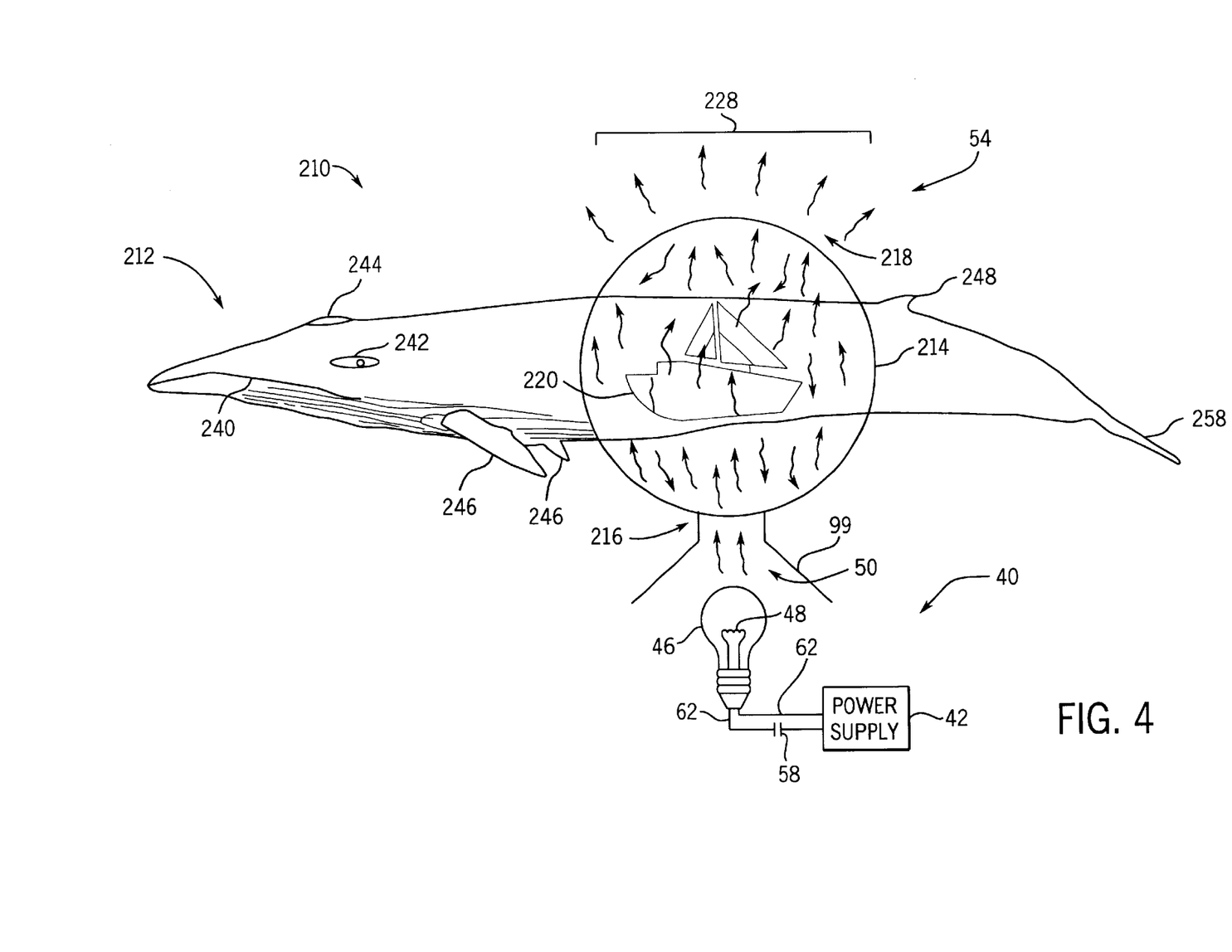
FIG. 4 is a side elevation view of a radiation demonstration system according to an alternative embodiment of the present invention.

Referring to FIG. 4, a radiation demonstration system 210 is shown according to an alternative embodiment of system 10. System 210 includes lighting assembly 40 and a subject in the shape of an aquatic creature shown as a whale 212. Whale 212 includes a central portion 228, a mouth 240, an eye 242 positioned above mouth 240, a blowhole 244 positioned above eye 242, a fin 246 adjacent central portion 228, a dorsal fin 248, and a tail 258. Whale 212 may be constructed of an opaque or non-opaque flexible or inflexible material. System 210 includes a matrix 214 that surrounds central portion 228 of whale 212. Central portion 228 of whale 212 surrounds a nautical vessel shown as a boat 220. Incident light 50 generated by lighting assembly 40 enters matrix 214 at a proximal end 216 and exits matrix 214 at a distal end 218 such that at least central portion 228 of matrix 214, whale 212 and boat 220 tends to glow.

Figure 5:
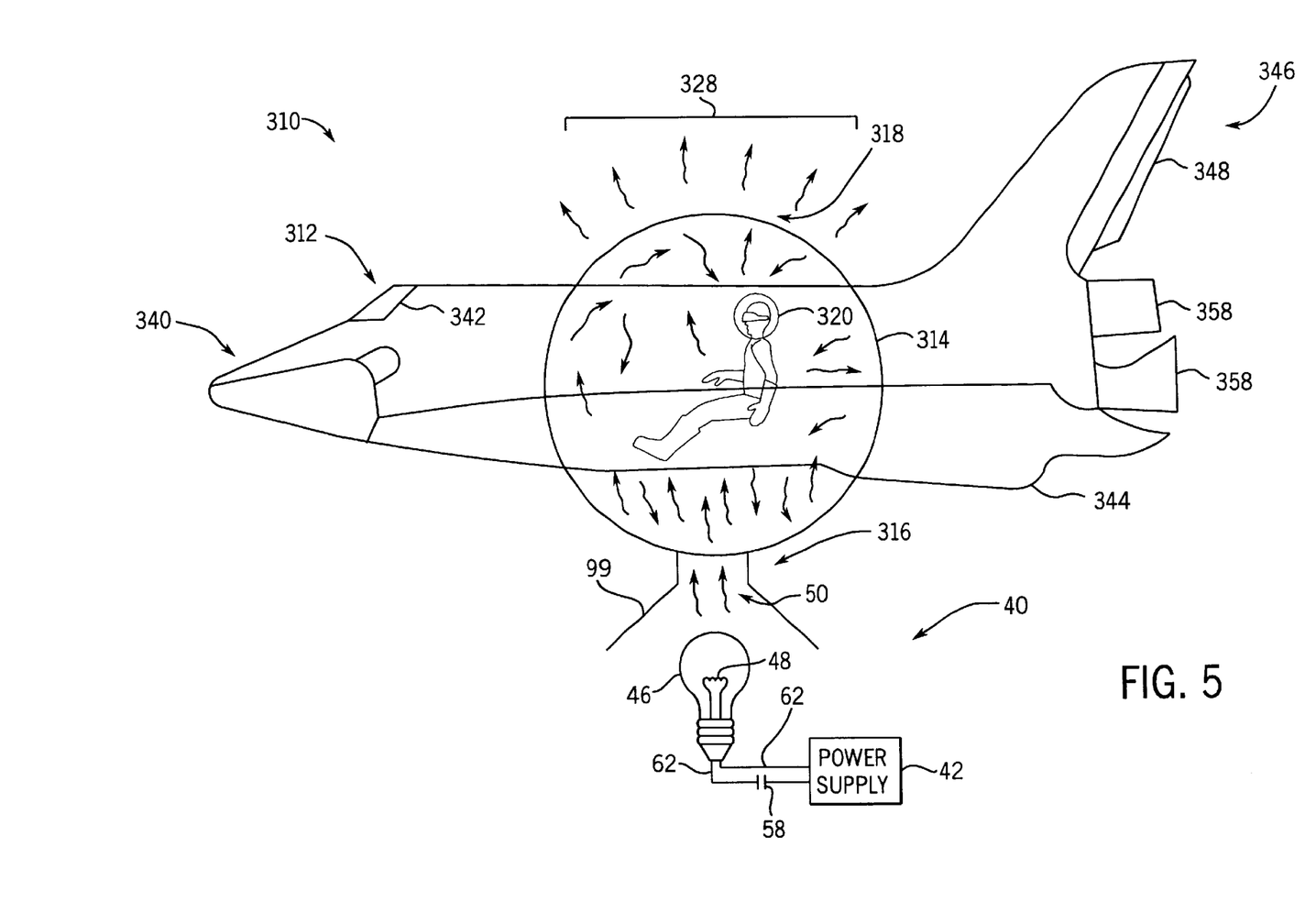
FIG. 5 is a side elevation view of a radiation demonstration system according to an alternative embodiment of the present invention.

Referring to FIG. 5, a radiation demonstration system 310 is shown according to an alternative embodiment of system 10. System 310 includes lighting assembly 40 and a subject in the shape of an aircraft (e.g., airplane, rocket, unidentified flying object, etc.) shown as a shuttle 312. Shuttle 312 includes a nose 340, a window 342 positioned above nose 340, a central portion 328, a wing 344 mounted to central portion 328, a tail 346, a positioning flap 348 extending from tail 346, and a thruster 358 extending from tail 346. Shuttle 312 may be constructed of a non-opaque plastic material. System 310 includes a matrix 314 surrounding central portion 328 of shuttle 312. Central portion 328 of shuttle 312 surrounds an occupant shown as an astronaut 320. Incident light 50 generated by lighting assembly 40 enters matrix 314 at a proximal end 316 and exits matrix 314 at a distal end 318 such that matrix 314, shuttle 312 and astronaut 320 tend to glow.

The radiation demonstration system may be used to demonstrate some of the properties, characteristics and effects of radiation. For example, the illumination of the matrix, the subject, and the internal contents may cause a glow or luminescence, which may model radiation or an object being subjected to radiation. Specifically, the radiation demonstration system may be used to illustrate the theory that electromagnetic radiation is scattered and absorbed by an object, that an electromagnetic wave incident on a material containing a charge absorbs energy from the wave due to recoil, that an electromagnetic wave incident on a material containing a charge scatters having less energy and a longer wavelength than the incident wave, that light has both particle and wave properties, that the effects of radiation may be attenuated by a radiation-attenuating shield, etc. The radiation demonstration system may also show that radiation incident on a subject is scattered and that protection against such scattered radiation (provided, for example, by a radiation-attenuating shield) may be necessary.

According to a particularly preferred embodiment, the subject is a human figurine of about three inches in length, the matrix is constructed of a flexible, pink-colored, translucent, visco-elastic polymeric matrix of the type described in U.S. Pat. No. 4,938,233 titled "RADIATION SHIELD" issued Jul. 3, 1990 to Orrison, Jr., and the lighting assembly includes a pressure-sensitive switch that, when activated, causes a light bulb to emit a redcolored light.

It is important to note that the use of the term "radiation" is not meant as a term of limitation, insofar as all radiation (e.g., electromagnetic energy having wavelengths of $1.0 \times 10^{-15}$ meters to $1.0 \times 10_6$ meters, radiation from AC power lines, radiation from the earth, gamma rays, x-rays, cosmic rays, neutrons, natural or artificial light, etc.) is intended to be within the scope of the term.

Although only a few exemplary embodiments of the present invention have been described in detail in this disclosure, those skilled in the art who review this disclosure will readily appreciate that many modifications are possible in the exemplary embodiments (such as variations in sizes, structures, shapes and proportions of the various elements, values of parameters, or use of materials, colors of materials, colors of incident light, etc.) without materially departing from the novel teachings and advantages of the invention. For example, the subject may be provided in a variety of shapes (e.g., vessel, airplane, container, animal, alien, etc.), the internal contents may be provided in a variety of shapes (e.g., internal organs, foreign objects, random or whimsical objects, scissors, etc.) and the matrix may be provided in a variety of shapes (e.g., molded to surround the shape of a subject, molded in the shape of a subject, round, etc.). Accordingly, all such modifications are intended to be included within the scope of the invention as defined in the appended claims. Other substitutions, modifications, changes and omissions may be made in the design, operating conditions and arrangement of the preferred embodiments without departing from the spirit of the invention as expressed in the appended claims.

Those who review this disclosure should recognize that the subject matter recited in any method claims may be performed in any combination and in any sequence.

What is claimed is:

1. An apparatus to demonstrate the effects of radiation comprising:

a translucent gelatinous, visco-elastic matrix body having a shape comprising a figurine;

an internal material at least partially in the matrix body and attached to the matrix body;

a light source coupled to the matrix body;

wherein the light generated by the light source and directed toward the matrix body causes at least a portion of the matrix body to have a glowing effect.

2. The apparatus of claim 1 wherein the light source provides a visible light.

3. The apparatus of claim 1 wherein the internal material is substantially surrounded by the matrix body.

4. The apparatus of claim 1 wherein matrix body comprises a polymeric material.

5. The apparatus of claim 1 wherein the shape of the matrix body comprises a vehicle.

6. The apparatus of claim 1 wherein the shape of the matrix body comprises a vessel.

7. The apparatus of claim 1 wherein the shape of the matrix body comprises a human.

8. The apparatus of claim 1 wherein the shape of the matrix body comprises an aquatic creature.

9. The apparatus of claim 1 wherein the light source provides a visible red colored light.

10. An apparatus to demonstrate the effects of radiation comprising:

a translucent gelatinous, visco-elastic polymeric matrix body having a shape;

an internal material attached to and at least partially in the matrix body;

a light source coupled to the matrix body;

wherein the light generated by the light source and directed toward the matrix body causes at least a portion of the matrix body to have a glowing effect.

11. The apparatus of claim 10 wherein the light source provides a visible light.

12. The apparatus of claim 10 wherein the shape of the matrix body is a human figurine.

13. The apparatus of claim 10 wherein the internal material is substantially surrounded by the matrix body.

14. The apparatus of claim 10 wherein the shape of the matrix body is a vehicle.

15. The apparatus of claim 10 wherein the shape of the matrix body is an aquatic creature.

16. The apparatus of claim 11 wherein the light source provides a red colored light.

17. A method of demonstrating the properties and effects of radiation with an apparatus comprising a translucent, gelatinous visco-elastic polymeric matrix body having a shape, an interior material attached to and at least partially in the matrix body, and a light source coupled to the matrix body, comprising:

providing the gelatinous visco-elastic polymeric matrix body;

providing the internal material within the matrix body;

providing the light source adjacent the matrix body;

illuminating the matrix body with a visible incident light generated by the light source to cause at least a portion of the matrix body to have a glowing effect.

18. The method of claim 17 further comprising directly attaching the internal material to the matrix body.

19. The method of claim 18 wherein illuminating the matrix body further includes illuminating with a red-colored light.

20. An apparatus to demonstrate the properties of radiation comprising:

a polymeric matrix body comprising a non-opaque and flexible material having a pre-defined shape comprising a human figurine;

an interior material substantially surrounded by the matrix body;

a light source coupled to the matrix configured for generating and directing a focused beam of visible light at the matrix body;

wherein the beam of visible light generated by the light source tends to cause at least a portion of the matrix body to have a glow effect.

21. The apparatus of claim 20 wherein the light source is attached to the matrix body.

22. The apparatus of claim 20 wherein the interior material is representative of an internal organ.

23. The apparatus of claim 20 wherein the interior material comprises a skeleton.

24. The apparatus of claim 20 wherein the matrix body is provided with a scent.

25. The apparatus of claim 23 wherein the light source comprises a flashlight.

26. The apparatus of claim 20 wherein the matrix body comprises a rubber-like material.

27. The apparatus of claim 20 wherein the matrix body comprises a visco-elastic material.

28. An apparatus to demonstrate the properties of radiation comprising:

a polymeric matrix body comprising a non-opaque and rubber-like material having a pre-defined shape comprising a human figurine;

an interior material at least partially surrounded by the matrix body;

a light source coupled to the matrix configured for generating and directing a focused beam of visible light at the matrix body;

wherein the beam of visible light generated by the light source tends to cause at least a portion of the matrix body to have a glow effect.

29. The apparatus of claim 28 wherein the interior material is substantially surrounded by the matrix body.

30. The apparatus of claim 28 wherein the light source is attached to the matrix body.

31. The apparatus of claim 29 wherein the matrix body comprises a flexible material.

32. The apparatus of claim 29 wherein the interior material is representative of an internal organ.

33. The apparatus of claim 31 wherein the interior material comprises a skeleton.

34. The apparatus of claim 31 wherein the matrix body is provided with a scent.

35. The apparatus of claim 33 wherein the light source comprises a flashlight.

36. The apparatus of claim 31 wherein the matrix body comprises a visco-elastic material.

37. A model to demonstrate the properties of radiation comprising:

a non-opaque polymeric matrix comprising a visco-elastic material having a shape of a human figure;

a light source coupled to the matrix and configured for generating and directing a focused beam of visible light at the matrix;

wherein the beam of visible light generated by the light source tends to cause at least a portion of the matrix to glow.

38. The apparatus of claim 37 wherein the matrix comprises a gel.

39. The apparatus of claim 37 wherein the matrix comprises a translucent material.

40. The apparatus of claim 39 wherein the matrix comprises a unitary body of material.

* * * * *